United States Patent [19]

Kishi

[11] Patent Number: 4,864,493
[45] Date of Patent: Sep. 5, 1989

[54] INSTRUCTION ADDRESS PRODUCING UNIT CAPABLE OF ACCESSING AN INSTRUCTION SEGMENT OF AN EXTENDED SIZE

[75] Inventor: Takao Kishi, Tokyo, Japan

[73] Assignee: NEC Corporation, Tokyo, Japan

[21] Appl. No.: 908,774

[22] Filed: Sep. 18, 1986

[30] Foreign Application Priority Data

Sep. 19, 1985 [JP] Japan ................................ 60-205202

[51] Int. Cl.$^4$ ............................................... G06F 9/00
[52] U.S. Cl. .................................. 364/200; 364/255.1; 364/255.5; 364/255.8; 364/247; 364/247.2
[58] Field of Search ................................. 364/200, 900

[56] References Cited

U.S. PATENT DOCUMENTS

| 4,050,060 | 9/1977 | Birner et al. | 364/200 |
| 4,453,212 | 6/1984 | Galther et al. | 364/200 |
| 4,466,056 | 8/1984 | Tanahashi | 364/200 |
| 4,672,558 | 6/1987 | Takawe | 364/200 |

FOREIGN PATENT DOCUMENTS 60-241135 11/1985 Japan .

Primary Examiner—Gareth D. Shaw
Assistant Examiner—John G. Mills
Attorney, Agent, or Firm—Foley & Lardner, Schwartz, Jeffery, Schwaab, Mack, Blumenthal & Evans

[57] ABSTRACT

In an instruction address producing unit for producing an instruction address in response to an entry descriptor in cooperation with a segment descriptor segment (48), the entry descriptor has first and second segment fields (41 and 42) corresponding to first and second instruction descriptors stored in the segment descriptor segment, respectively. The first and the second instruction descriptors are partially read out of the segment descriptor segment to be kept in an instruction segment register (52) and an instruction counter (57), respectively, and to be produced as first and second retained instruction descriptors. An adder circuit (58) adds the first retained instruction descriptor to the second retained instruction descriptor to produce a result of addition as the instruction address. Each of the first and the second instruction descriptors may be an extended segment descriptor.

3 Claims, 4 Drawing Sheets

INSTRUCTION ADDRESS PRODUCING UNIT CAPABLE OF ACCESSING AN INSTRUCTION SEGMENT OF AN EXTENDED SIZE

BACKGROUND OF THE INVENTION

This invention relates to an instruction address producing unit for use in a processing unit of a digital computer system to access an instruction stored in a memory unit.

In a recent digital computer system, a memory unit is provided with a lot of instruction segments each of which has a variable segment size, namely, a variable address space to store a plurality of instructions. In each instruction segment, each instruction can be specified by a combination of a reference or start address of each instruction segment and a displacement representative of an address distance between the reference address and each instruction in the instruction segment in question. To this end, an instruction segment descriptor is used to indicate the reference address of each instruction segment and the displacement in each instruction segment on accessing each instruction. In addition, the segment size of each instruction segment is also indicated by the instruction segment descriptor.

A processing unit comprises an instruction address producing unit for processing an instruction segment descriptor of the type described to produce an instruction address for an instruction in question. More particularly, the instruction address producing unit comprises a segment descriptor register and an instruction counter for storing the instruction segment descriptor and the instruction address, respectively.

Meanwhile, it is possible that a certain instruction segment must be changed to another instruction segment during execution of the instructions stored in the above-mentioned certain instruction segment. Such a change of instruction segments may occur in response to either a branch instruction or an optional instruction. In this event, contents of the segment descriptor register and the instruction counter should be altered to a different one.

As will later be described with reference to one figure of the accompanying drawing, a conventional instruction address producing unit changes the instruction segments from a preceding one to a following one by the use of an entry descriptor which has a location field for a following displacement of a following instruction stored in the following instruction segment and a descriptor field for a following segment descriptor. The following segment descriptor serves to indicate the reference address of the following instruction segment which is set into the segment descriptor register. On the other hand, the following displacement is directly stored in the instruction counter and combined with the reference address of the following instruction segment into the following instruction address.

In such an instruction address producing unit, the entry descriptor makes it possible to access the following instruction segment of a segment size determined by the location field of a bit number which is equal, for example, to 18 bits.

It is a recent trend that the segment size of each instruction segment is extended or enlarged with an increase of a memory capacity of the memory unit. Under the circumstances, it is not preferable that the segment size of each instruction segment is restricted by the bit number of the location field of the entry descriptor.

In Japanese Unexamined Patent Publication No. Syo 60-241,135, namely, 241,135/1985, an address producing method is described by H. Takane so as to define an increased address space, or an increased segment size, of each instruction segment by the use of a specific segment descriptor. Such a specific segment descriptor has a base field of 36 bits for the reference address of the specific segment descriptor, a bound field of 20 bits, and a mode indication bit representative of either a non-extension or normal mode or an extension mode. The specific segment descriptor is used as an extended segment descriptor when the extension mode is indicated by the mode indication bit. Otherwise, the specific segment descriptor is used as a normal segment descriptor.

In the extended mode, an additional bit set of 12 bits is combined with the bound field of the specific segment descriptor into an extended bound field of 32 bits. If each bit of the extended bound field is made to correspond to a single byte, the extended bound field of $2^{32}$ bits can define an extended segment of $2^{32}$ bytes.

However, no consideration is paid about any entry descriptor in the above-referenced Takane patent publication. Accordingly, the instruction counter may be loaded with the location field of the entry descriptor in the above-mentioned manner. In this event, it is to be noted here that not all instructions can be accessed in the extended segment because the location field of the entry descriptor has only a bit capacity of 18 bits, as mentioned before, and the instruction counter can merely indicate the instruction addresses of $2^{18}$ in number.

SUMMARY OF THE INVENTION

It is an object of this invention to provide an instruction address producing unit which is capable of extending an instruction segment in size.

It is another object of this invention to provide an instruction address producing unit of the type described, wherein all instruction addresses can be specified in the extended instruction segment by an entry descriptor.

An instruction address producing unit to which this invention is applicable is utilized in producing an instruction address in response to an entry descriptor in cooperation with a memory unit which has a plurality of descriptor addresses successively numbered from a reference descriptor address so as to store a plurality of instruction descriptors in the respective descriptor addresses. According to this invention, the entry descriptor has a first and a second segment field for specifying first and second descriptor addresses with reference to the reference descriptor address to read a first and a second one of the instruction descriptors out of the memory unit, respectively. The instruction address producing unit comprises retaining means for retaining the first and the second ones of the instruction descriptors to produce first and second retained instruction descriptors, respectively, and instruction address deriving means coupled to the retaining means for deriving the instruction address from the first and the second retained instruction descriptors.

DESCRIPTION OF THE PREFERRED EMBODIMENTS

Figure 1:
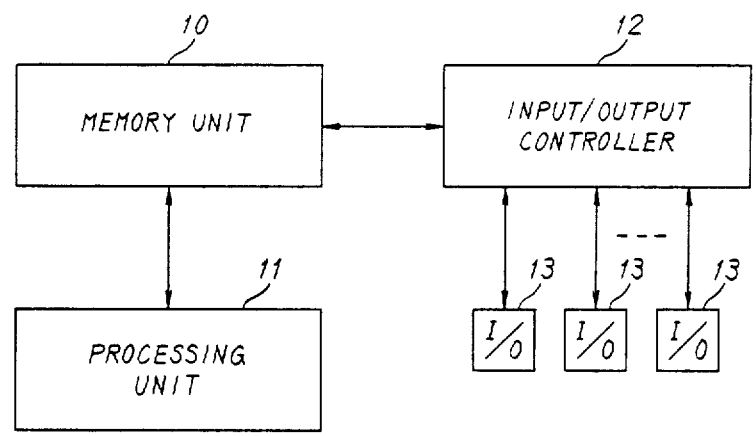
FIG. 1 is a block diagram of a data processing system comprising an instruction address producing unit to which this invention is applicable.

Referring to FIG. 1, description will be directed to a data processing system comprising an instruction address producing unit to which this invention is applicable. In FIG. 1, the data processing system comprises a memory unit 10 for storage of a great amount of instructions and data both of which are necessary for executing a program or programs. The memory unit 10 comprises a plurality of instruction segments which will presently be illustrated and each of which is loaded with the instructions and a plurality of data segments. Each data segment is loaded with the data. A processing unit or operation unit 11 is coupled to the memory unit 10 to read the instructions and the data out of the memory unit 10 and to execute the program or programs. A plurality of input/output devices 13 are coupled through an input/output controller 12 to the memory unit 10. The input/output controller 12 controls data transmission between the memory unit 10 and the input/output devices 13.

The instruction address processing unit of this invention is included in the processing unit 11 and cooperates with the instruction segment or segments in a manner to be described later.

Figure 2:
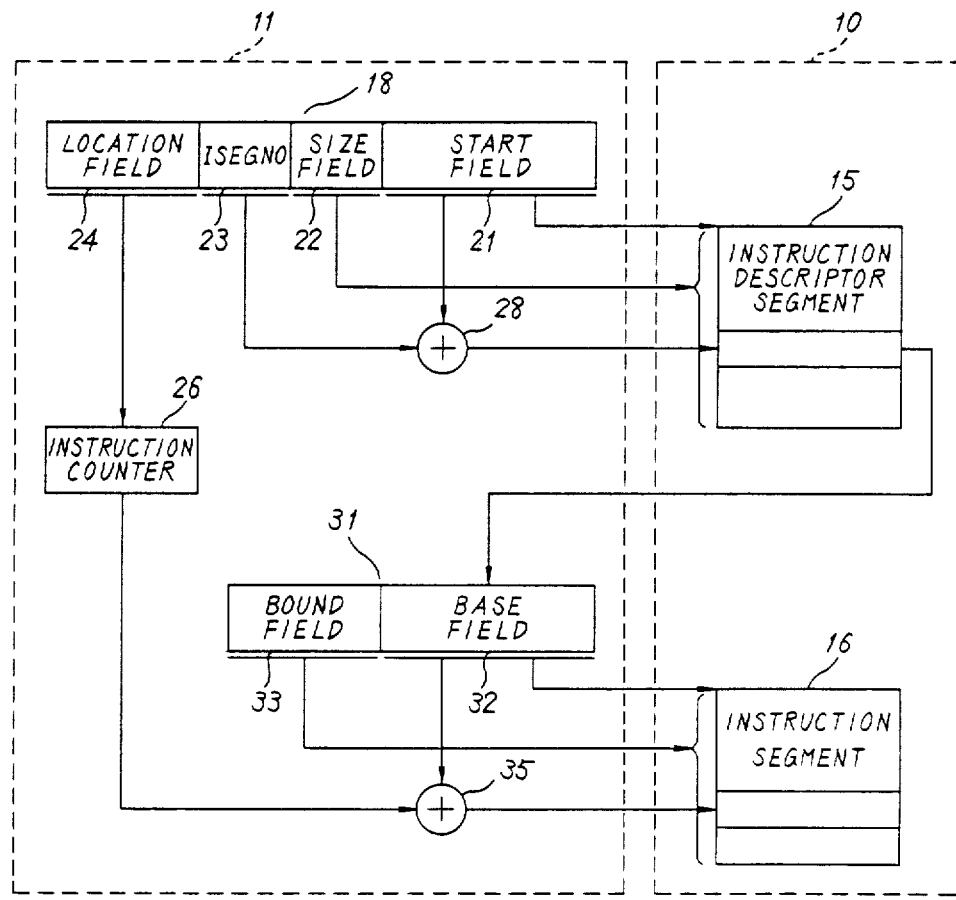
FIG. 2 shows a block diagram of a conventional instruction address producing unit included in a processing unit, together with a memory unit.

Referring to FIG. 2, a conventional instruction address producing unit will be described for a better understanding of this invention. Like the instruction address producing unit according to this invention, the conventional instruction address producing circuit is included in the processing unit 11 described in conjunction with FIG. 1. Although a great number of circuit elements are arranged in the processing unit 11, as known in the art, only a part of the processing unit 11 is illustrated in FIG. 2 for brevity of description and is operable as the instruction address producing unit as will become clear. On the other hand, the memory unit 10 is provided with a plurality of instruction segments, a plurality of data segments, and a plurality of segment descriptor segments. The instruction and the data segments are for storing instructions and data, respectively. The segment descriptor segments are for storing a plurality of segment descriptors which are divided into instruction segment descriptors and data segment descriptors for identifying instruction segments and data segments, respectively. For simplification of illustration, a single one of the segment descriptor segments and a single one of the instruction segments are depicted at 15 and 16 in FIG. 2, respectively. In this connection, it will be readily understood that the illustrated segment descriptor segment 15 stores the instruction segment descriptors and may be called an instruction descriptor segment. It is assumed that each instruction stored in the instruction segment 16 is represented by a single word of $2^2$ bytes and that each instruction segment descriptor is represented by two words of $2^3$ bytes and therefore has a bit length of 72 bits.

The conventional instruction address producing unit is supplied with an entry descriptor which is read out of the memory unit 10 in a known manner when necessity arises for the entry descriptor. For example, the entry descriptor is produced when the instruction segments must be changed from one to another during execution of a program. In addition, the entry descriptor is also produced when the segment descriptor segments should be altered.

At any rate, the entry descriptor is kept in an entry descriptor register 18 in the instruction address producing unit 11 and has a length of two words. The entry descriptor has a start field 21 of 26 bits, a size field 22 of 10 bits, a segment field (ISEGNO) 23 of 10 bits, and a location field 24 of 18 bits. Let the entry descriptor indicate the illustrated instruction descriptor segment 15 as a following instruction descriptor segment mentioned hereinbefore. In the entry descriptor, the start field 21 is indicative of a start address of the instruction descriptor segment 15 while the size field 22 is representative of a segment size. The segment field (ISEGNO) 23 is indicative of a descriptor address of the following instruction descriptor in question. The descriptor address is represented by a relative descriptor address from the start address. The location field 24 is indicative of an instruction address which is included in the instruction segment 16 under consideration and which is represented by a relative instruction address determined in relation to the instruction segment 16.

The location field 24 of the entry descriptor is delivered to an instruction counter 26 to be kept therein. The start address 21 defines the instruction descriptor segment 15 in question and is added by a first adder 28 to the segment field 23 to specify one of descriptor addresses of the instruction descriptor segment 15. As a result, one of the instruction descriptors is read out of the one descriptor address of the instruction descriptor segment 15 to be kept as a specified instruction descriptor in an instruction descriptor register 31.

The specified instruction descriptor has a base field 32 of 36 bits, a bound field 33 of 20 bits, and a control field of 8 bits. The control field is not shown in FIG. 2. The base field 32 specifies the instruction segment 16 in question by indicating a base or reference instruction address of the instruction segment 16. The bound field 33 defines a segment size of the instruction segment 16 and serves to determine whether or not the instruction segment is to be changed to another instruction segment. For this purpose, the bound address is always monitored in the known manner. Such a monitoring operation has no concern with the instant invention and therefore will not be described any longer If each bit of the bound field can indicate a single byte, the bound field can define the instruction segment having the segment size of $2^{20}$ bytes. Therefore, the instruction segment can store the instructions of $2^{18}$ bits when each instruction is represented by one word of $2^2$ bytes. From this fact, it is understood that the least significant bit and the least significant bit but one of the bound field identify four bytes of each word.

In FIG. 2, a second adder 35 sums up the base field 32 of the specified instruction descriptor and the location field 24 of the entry descriptor kept in the instruction counter 26. The second adder 35 thereby calculates an instruction address in which the instruction in question is stored.

With this structure, the segment size of each instruction segment is restricted by the bound field 33 of the specified instruction descriptor and is therefore equal to or smaller than $2^{20}$ bytes.

As described in the preamble of the instant specification, consideration is directed to an extended instruction segment descriptor in the referenced Takane patent publication so as to extend a segment size of each instruction segment, such as 16. The extended instruction segment descriptor has a bound field of 20 bits and a base field of 32 bits like the instruction segment descriptor which is mentioned above and which may be called a normal instruction segment descriptor. The extended instruction segment descriptor is distinguished from the normal instruction segment descriptor in the processing unit 11 in a manner mentioned in the Takane patent publication and is kept in the instruction segment descriptor register 31. On reception of the extended instruction segment descriptor, the bound field of 20 bits is concatenated to an additional bit set of 12 bits and is processed as an extended bound field of 32 bits.

Accordingly, the extended bound field can define an instruction segment of $2^{32}$ bytes. However, the location field 24 of 18 bits can merely access the instruction segment at every unit of $2^{12}$ bytes and therefore can not individually indicate each of the instructions stored in the extended instruction segment, as described before.

Figure 3:
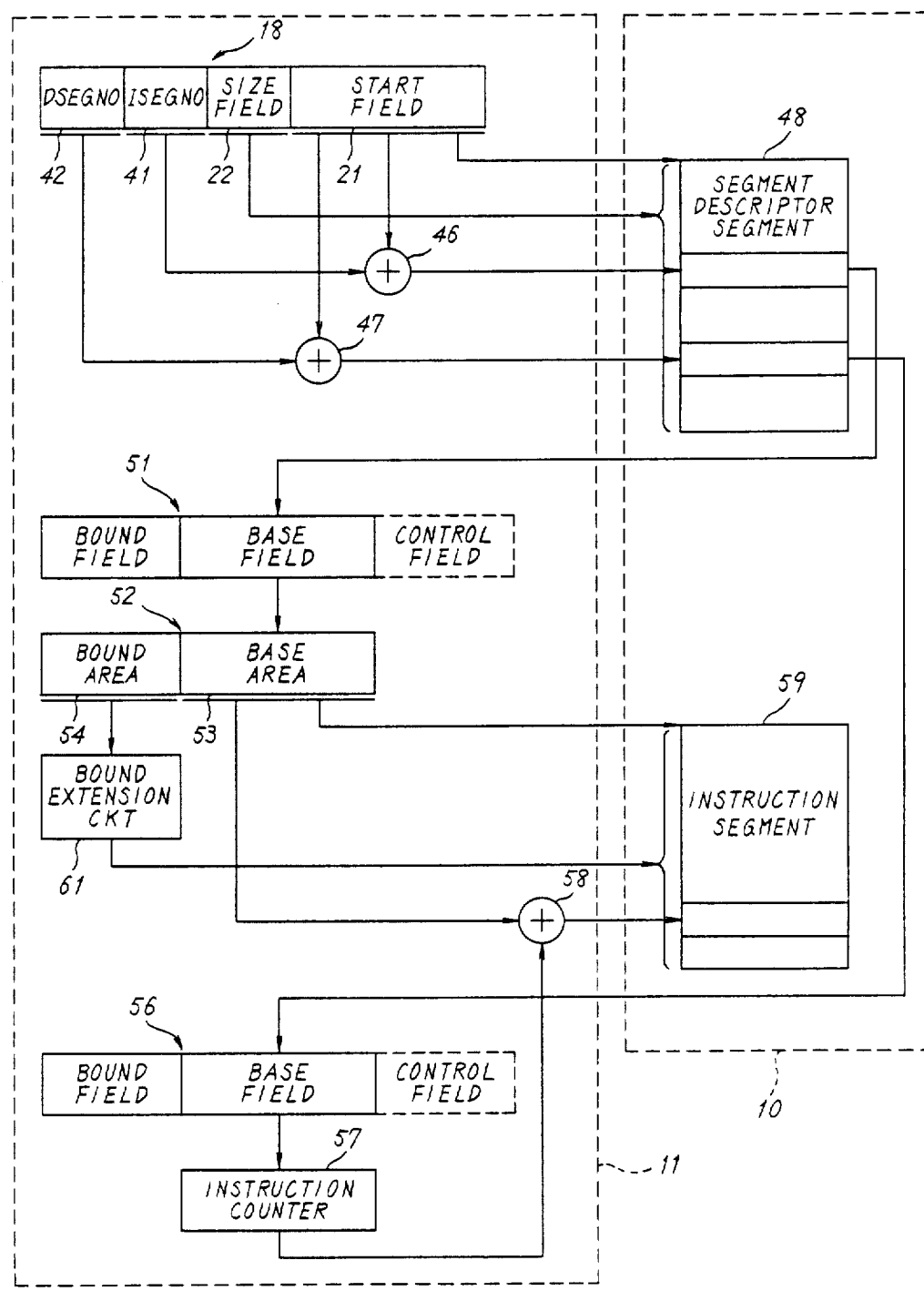
FIG. 3 shows a block diagram of an instruction address producing unit according to an embodiment of this invention, together with a memory unit.

Referring to FIG. 3, a processing unit 11 comprises an instruction address producing unit according to an embodiment of this invention and cooperates with the memory unit 10 of the type described in connection with FIG. 1. The illustrated instruction address producing unit is supplied from the memory unit 10 with an entry descriptor in a known manner. The entry descriptor has a length of seven bytes, namely, 63 bits and comprises a start field 21 of 26 bits and a size field 22 of 10 bits like in FIG. 2. The size field 22 represents a segment size of a segment descriptor segment 48 by using a single byte as a unit of measurement. In other words, a single byte is used as a unit so as to express the segment size. The resultant segment size becomes equal to $2^{10}$ byte at maximum. The segment descriptor segment 48 will shortly be described.

It is to be noted here that the entry descriptor of FIG. 3 can specify two instruction segment descriptors which have a common start address indicated by the start field of the entry descriptor. In this connection, the entry descriptor has a first segment field (ISEGNO) 41 of 10 bits and a second segment field (DSEGNO) 42 of 10 bits. Although not shown in FIG. 3, a flag field of nine bits follows the start field 21.

The first segment field 41 is similar to the segment field 23 (FIG. 2) and indicates a primary descriptor address of a primary segment descriptor in question in the form of a relative descriptor address determined in relation to the start address. The second segment field 42 is indicative of an additional descriptor address assigned to an additional segment descriptor which will later become clear. The additional descriptor address is also represented in the form of another relative descriptor address determined in relation to the start address. Each of the primary and the additional descriptor addresses can specify an information unit of $2^3$ bytes, namely, each descriptor of $2^3$ bytes. Stated otherwise, eight bytes are used as a unit in each segment field 41 and 42.

The entry descriptor is kept in the entry descriptor register 18 of the instruction address producing unit.

Under the circumstances, the primary descriptor address of the first descriptor field 41 is added by a first adder element 46 to the start address of the start field 21 while the additional descriptor address of the second descriptor field 42 is added by a second adder element 47 to the start address. As a result, the first and the second adder elements 46 and 47 produce the primary and additional descriptor addresses assigned to the primary and the additional segment descriptors, respectively.

Herein, it is assumed that the start address of the entry descriptor indicates the above-mentioned segment descriptor segment 48 and that the segment descriptor segment 48 stores the primary and the additional segment descriptors. In the example being illustrated, each of the primary and the additional segment descriptors has a length of $2^3$ bytes, namely, 72 bits and is assumed to b a specific segment descriptor as mentioned in the above-referenced publication. Such a specific segment descriptor has a control field including a mode field representative of either a non-extension mode or an extension mode. For brevity of description, let the extension mode be indicated by the mode fields of the primary and the additional segment descriptors. The primary and the additional segment descriptors may therefore be called first and second extended instruction segment descriptors, respectively, or simply first and second instruction descriptors, respectively.

In FIG. 3, the primary segment descriptor which is read out of the segment descriptor segment 48 is indicated at 51 in FIG. 3. The primary segment descriptor 51 has a bound field of 20 bits, a base field of 36 bits following the bound field, and the control field of 8 bits depicted at a broken line and is kept in an instruction segment register 52. The instruction segment register 52 may be called a storing element and has a base area 53 for the base field of the primary segment descriptor and a bound area 54 for the bound field thereof.

Likewise, the additional segment descriptor read out of the segment descriptor segment 48 is depicted at 56 and has a base field of 36 bits, a bound field of 20 bits, and the control field. As to the additional segment descriptor 56, the base field of 36 bits may be considered with the bound and the control fields left out of consideration, as will become clear as the description proceeds.

In any event, the base field of the additional segment descriptor 56 is set into an instruction counter 57 of 32 bits and sent through an adder circuit 58 to an instruction segment 59. The instruction counter 57 is loaded only with the base field of 32 bits with four lower bits of the base field unloaded in the instruction counter 57. Thus, the instruction counter 57 can access instructions of $2^{32}$ stored in each instruction segment 59. As a result, a segment size of each instruction segment is extended by the use of the illustrated entry descriptor and the additional segment descriptor 56 because a bit capacity of the base field is greater than that of the second segment field 42.

As mentioned above, a combination of the instruction segment register 52 and the instruction counter 57 may be referred to as a retaining circuit for retaining the primary and the additional segment descriptors 51 and 56 to produce a first and a second retained segment descriptor, respectively.

More particularly, the bound field of the primary segment descriptor 51 is sent from the instruction segment register 52 to the bound extension circuit 61 which is controlled by the control field of the primary segment descriptor 51 in a manner similar to that described in the referenced Takane patent publication. In the extension mode, the bound field of 20 bits and an additional bit set of 12 bits are concatenated together into an extended bound field of 32 bits in the bound extension circuit 61 as mentioned in the referenced publication. Consequently, the instruction segment 59 can have the segment size equal in number to $2^{32}$ bytes at maximum.

Responsive to the primary and the additional segment descriptors 51 and 56 retained in the instruction segment register 52 and the instruction counter 57, the adder circuit 58 adds the base field of the primary segment descriptor 51 to the base field of the additional segment descriptor 56 and produces a result of addition as an instruction address. The instruction address is delivered to the instruction segment 59 to access an instruction stored in the instruction address.

Thus, the adder circuit 58 is operable to derive the instruction address from the primary and the additional segment descriptors 51 and 56 and may therefore be referred to as an instruction address deriving circuit.

Figure 4:
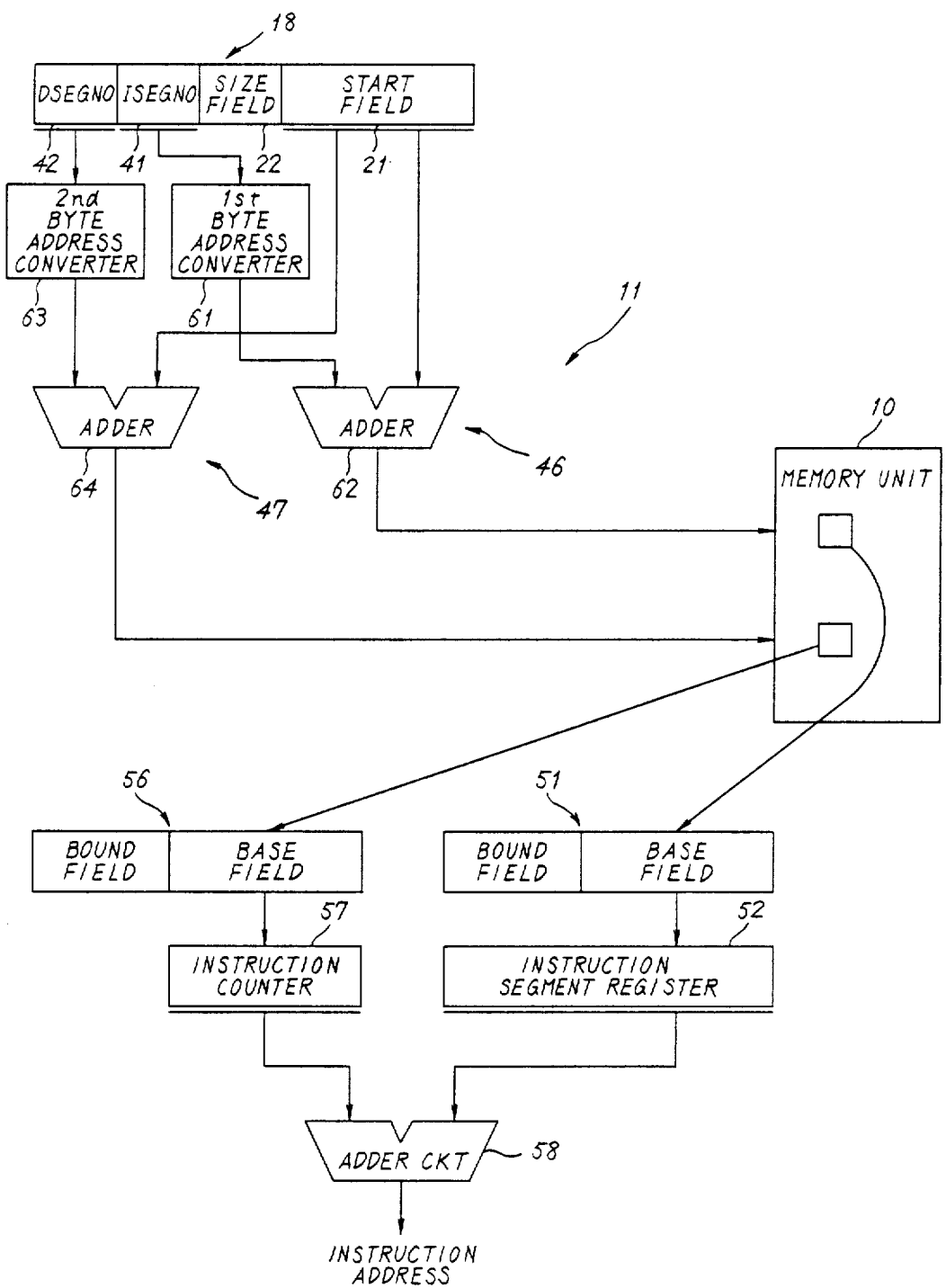
FIG. 4 is a bock diagram, similar to FIG. 3, for use in describing operation of the instruction address producing unit in detail.
Figure 5:
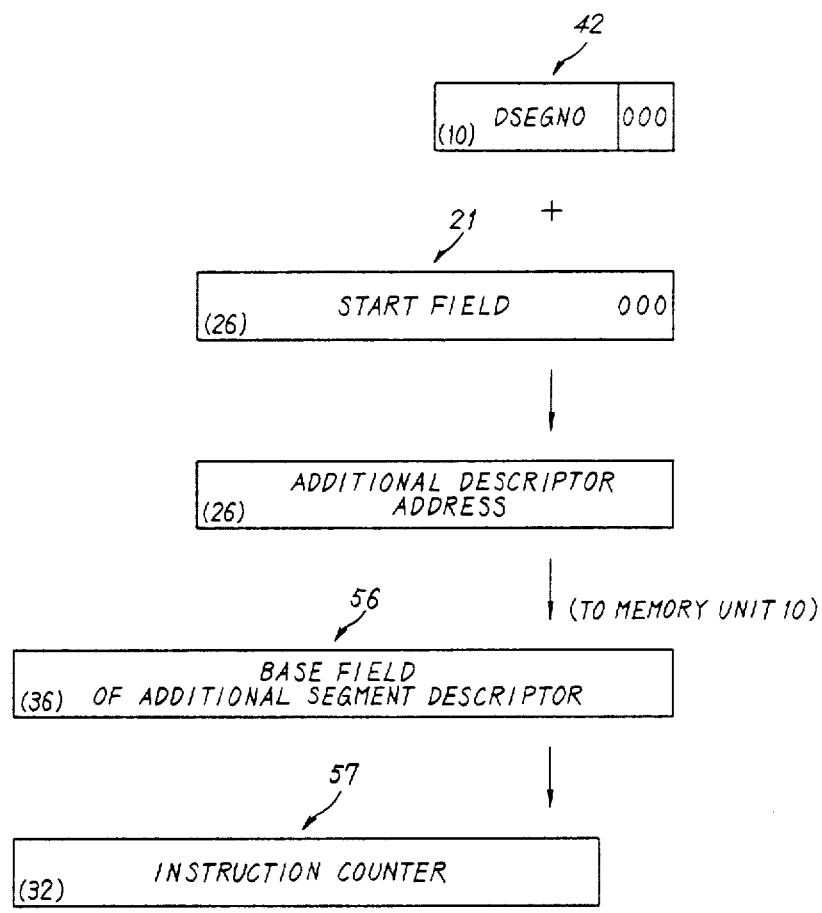
FIG. 5 is a flow chart for use in describing a part of the operation of the instruction address producing unit depicted in FIG. 3.

Referring to FIGS. 4 and 5, description will be made as regards a method of producing the instruction address in question in response to the entry descriptor illustrated in FIG. 3. The entry descriptor is kept in the entry descriptor register 18 and has the first and the second segment fields 41 and 42 (labelled ISEGNO and DSEGNO) together with the start field 21 and the size field 22.

The first segment field 41 and the start field 21 are delivered to the first adder element 46 which comprises a first byte address converter 61 and a first adder 62. Likewise, the second segment field 42 and the start field 21 are sent to the second adder element 47 which comprises a second byte address converter 63 and a second adder 64.

Inasmuch as each of the first and the second segment fields 41 and 42 specifies the memory unit 10 at every unit of $2^3$ bytes, as described before, each segment field is converted so that the memory unit 10 can be specified at every unit of a single byte. For this purpose, the first and the second byte address converters 61 convert the first and the second segment fields into a first and a second intermediate address each of which specifies the memory unit 10 at every unit of the single byte. As exemplified by the second segment field 42 in FIG. 5, three bits of (000) are concatenated to the least significant bit of each segment field. Thus, the intermediate address is represented by thirteen bits in total, as illustrated in FIG. 5. As a result, an address space defined by each intermediate address is extended in comparison with that defined by each segment field.

The start field 21 of 26 bits in the entry descriptor is added to the first and the second intermediate addresses in the first and the second adders 62 and 64, respectively. As shown in FIG. 5, the start field 21 has three lower bits of (000) to indicate each instruction segment descriptor of $2^3$ bytes stored in the memory unit 10.

At any rate, the primary and the additional descriptor addresses are supplied from the first and the second adders 62 and 64 to the memory unit 10, as exemplified by the additional descriptor address in FIG. 5.

As a result, the primary and the additional segment descriptors 51 and 56 are read out of the memory unit 10 and may be extended segment descriptors as mentioned in conjunction with FIG. 3. The primary and the additional segment descriptors 51 and 56 do not always belong to a common segment descriptor segment, such as 48 of FIG. 3.

The primary segment descriptor 51 is stored in the instruction segment register 52 in the manner described in FIG. 3. The bound field of 36 bits is restricted to 32 bits by removing four lower bits from the bound field of the primary segment descriptor 51. The first retained instruction descriptor of 32 bits is delivered to the adder circuit 58.

As shown in FIG. 5, the bound field of the additional segment descriptor 56 is sent to the instruction counter 57 of 32 bits. In this event, thirty-two upper bits of the bound field of the additional segment descriptor 56 are kept in the instruction counter 57 to be sent to the adder circuit 58 as the second retained instruction descriptor of 32 bits. The result of addition is sent to the memory unit 10 as the instruction address.

While this invention has thus far been described in conjunction with a preferred embodiment thereof, it will readily be possible for those skilled in the art to put this invention into practice in various other manners. For example, each of the primary and the additional segment descriptors 51 and 56 may not be the extended segment descriptor but a normal segment descriptor which has a base field having a bit capacity greater than the location field of the entry descriptor (FIG. 1). Alternatively, the entry descriptor of FIG. 1 may be used together with the entry descriptor of FIGS. 3 and 4. In this event only the extended segment descriptors are read out of the memory unit 10 in response to the entry descriptor illustrated in FIGS. 3 and 4.

What is claimed is:

1. An instruction address producing unit for use in producing an instruction address in response to an entry descriptor in cooperation with a memory unit which has a plurality of descriptor addresses successively numbered from a reference descriptor address in a segment descriptor segment specified by said entry descriptor so as to store a plurality of instruction segment descriptors in the respective descriptor addresses of said segment descriptor segment, wherein:

said entry descriptor has, in addition to a reference field for said reference descriptor address, first and second segment identifying fields for specifying first and second descriptor addresses in said segment descriptor segment, said first and said second descriptor addresses being representative of relative addresses from said reference descriptor addressing in segment descriptor segment, respectively;

said instruction address producing unit comprising:

accessing means responsive to said entry descriptor for accessing said memory unit to read first and second instruction segment descriptors out of said memory unit, respectively;

retaining means coupled to said memory unit for retaining said first and said second instruction segment descriptors which are read out of said segment descriptor segment to produce first and second retained instruction segment descriptors, respectively; and instruction address deriving means coupled to said retaining means for deriving said instruction address from said first and said second retained instruction segment descriptors.

2. An instruction address producing unit as claimed in claim 1, said instruction address being for indicating an instruction which is located in said instruction descriptor segment having a base address and a predetermined size, each of said first and said second instruction segment descriptors having a base field for specifying said base address while said first instruction segment descriptor has a bound field for specifying said predetermined size, wherein said retaining means comprises:

storing means coupled to said memory unit for storing said first instruction segment descriptor; and instruction counter means for loading the base field of said second instruction segment descriptor;

said instruction address deriving means being coupled to said storing means and said instruction counter means and comprising:

adding means coupled to said storing means and said instruction counter means for adding the base field of said first instruction segment descriptor to the base field of said second instruction segment descriptor to produce said instruction address.

3. An instruction address producing unit as claimed in claim 2, said memory unit comprising a plurality of segment descriptor segments, wherein said first and said second descriptor addresses are included in a common segment descriptor segment.

* * * * *